United States Patent Office 3,549,365
Patented Dec. 22, 1970

3,549,365

LITHOGRAPHIC PRINTING SURFACE

Daniel C. Thomas, Covina, Calif., assignor, by mesne assignments, to Lithoplate, Inc., Philadelphia, Pa., a corporation of Illinois No Drawing. Filed Feb. 18, 1966, Ser. No. 528,414
Int. Cl. G03f 7/02
U.S. Cl. 96—33 25 Claims

ABSTRACT OF THE DISCLOSURE

A lithographic plate made by applying to a support member, such as aluminum, either directly or over a previously applied resin subcoat, a hydrophilic barrier coating formed by application of an aqueous solution of a solute consisting essentialy of an aromatic sulfonic acid, preferably one with at least three reactive groups, either amino or sulfonic acid groups. Preferably the hydrophilic barrier coating is overlaid with a water soluble zirconium or titanium salt and with a light sensitive coating.

This invention relates generally as indicated to a lithographic printing surface and more particularly to a lithographic plate base having a novel intermediate or barrier layer thereon.

In the preparation of lithographic plates, a light-sensitive coating is provided on the surface of a support member which is subsequently exposed to light through a transparency, stencil, negative or the like. The selected areas of the light-sensitive coating so exposed undergo a reaction thus providing a surface having a differential solubility in the light-exposed and unexposed areas. The plate may then be developed with a suitable solvent to remove the undesired areas and thus form the desired image on the surface.

To be acceptable commercially, lithographic plates must be capable of producing many thousands of impressions. In prior plates, the hydrophilic areas provided by the bare metal of the plate tended to lose their water-attractiveness after a period of time. When this occurs, the plate begins to pick up ink in these areas so that "scumming" of the plate results, and accordingly copies printed from the plate are of unacceptable quality.

In an effort to minimize scumming and thus lengthen the useful life of the plate, various materials have been used as a hydrophilic intermediate or barrier layer between the support member and the light-sensitive coating. To be an acceptable barrier layer, such material must, of course, be hydrophilic and incapable of undergoing a harmful reaction with the light-sensitive materital. A suitable sublayer must also be capable of receiving and retaining the light-sensitive material prior to exposure and development and of releasing certain areas of the light-sensitive coating after light exposure while firmly retaining such material in other areas.

With the diazo light-sensitive materials, there is also the additional objection that many such compounds react chemically with the metal surfaced plates with which they are normally used. Consequently, whenever a diazo material is used as the light-sensitive coating, it is necessary to include a hydrophilic sublayer which completely and effectively seals the metal surface from the diazo material and accordingly prevents chemical reaction therebetween.

In recent years, the use of various diazo materials as the light-sensitive coating has become quite popular, because a completely "presensitized plate" may be prepared which can be stored in light-excluding packages for several months prior to use. At that time, the plate is simply converted to the desired printing plate by exposure to a ligh source in the typical fashion and thereafter developed to form the desired image. To enhance the quality and to improve the storage life of such plates, it is extremely important that a sublayer having the indicated characteristics be provided between the plate base and light-sensitive coating to preclude deterioration or decomposition of the diazo material through contact and reaction with the metal surface.

Another common practice which is presently used quite extensively is to prepare a plate having the desired hydrophilic sublayer thereon but without the overlying light-sensitive coating. Plates of this type are purchased by printers and are used whenever necessary by merely wiping on a solution of light-sensitive material, and after drying, the plate is then ready for light exposure. Accordingly, such plates have become known in the art as "wipe-on plates." Since the hydrophilic layer is exposed to the atmosphere in plates of this type and is not protected by an overlying layer of light-sensitive material, as in the case of presensitized plates, certain of the sublayers which have been previously provided have been found to deteriorate after a period of time and lose their hydrophilic character.

It is a principal object of the present invention therefore to provide a lithographic printing surface which includes a novel barrier layer.

It is another object of this invention to provide a lithographic plate with an intermediate or barrier layer which will provide a complete and effective seal for a metal surfaced plate from a light-sensitive diazo compound.

Yet another object of this invention is the provision of a lithographic plate in which the intermediate layer is formed with an aromatic sulfonic acid.

Other objects, features and advantages of this invention will become apparent to those skilled in the art after a reading of the following more detailed description.

To the accomplishment of the foregoing and related ends, the invention, then, comprises the features hereinafter fully described and particularly point out in the claims, the following description setting forth in detail certain illustrative embodiments of the invention, these being indicative, however, of but a few of the various ways in which the principle of the invention may be employed.

These and other objects are achieved by means of this invention in which a lithographic printing surface is provided which compirses a support member, a light-sensitive coating and an intermediate hydrophilic barrier coating which is formed by applying to the support member an aqueous solution of an aromatic sulfonic acid. In certain preferred embodiments, the barrier coating is formed from such sulfonic acid in combination with a water-dispersible resin such as an amine modified ureaformaldehyde or melamine formaldehyde and a water soluble salt of metal such as zirconium or titanium. As will be seen from the working examples and description which follow, such printing surfaces may be prepared by a relatively simple process and are capable of being used in standard lithographic procedures for the production of many copies without loss of reproducibility in the image areas.

The support or backing member for the lithographic surface may, in general, be any of the standard metal or metal surfaced plates which are commonly used in lithographic printing so long as it has a substantially uniform surface on at least one side to which the sublayer of this invention may be applied and firmly retained. Aluminum and zinc are generally the preferred plates. The support member may also be a coated paper such as that used in the manufacture of direct image plates or photosensitive plates. Illustrative examples of such materials include paper or other sheet stock coated with an alginate, casein, carboxy methyl cellulose or the like. Also, as per the standard technique, the paper sheet may be impregnated with a thermosetting resin such as phenol formaldehyde.

The lithographic plate has adhered to the support member a novel adherent barrier coating which seals the surface of the base member and thus prevents contact between the base member and the subsequently applied overlying photosensitive coating. The barrier layer is also, of course, hydrophilic and oleophobic so as to be scum preventing and to reduce tone in the resulting printing plate, and retains its hydrophilic character for extended periods of time prior to application of a light-sensitive coating. The combination of a lithographic plate base with this barrier layer and a subsequently applied sensitizer has good shelf life, clean running properties and good length of run.

The hydrophilic barrier coating is formed from an aromatic sulfonic acid and preferably from such an acid which has at least three reactive groups as for example amino and sulfonic acid groups. There are numerous such acids which are suitable for use in this invention, and these include various benzene sulfonic acids as for example 2-amino-p-benzene disulfonic acid (aniline 2,5-disulfonic acid), aniline 2,4-disulfonic acid, benzene trisulfonic acid, benzene disulfonic acid, and 2,4-diamino benzene sulfonic acid. Additional suitable sulfonic acids include naphthalene sulfnoic acids such as 1,3,5 and 1,3,6 and 1,3,7 naphthalene trisulfonic acid, 1,3,5,7 naphthalene tetrasulfonic acid, and various amino disulfonic acids, such as 8-amino-1-naphthol-3,6 disulfonic acid, 3-amino-1,5 naphthalene disulfonic acid, 3-amino-2,7-naphthalene disulfonic acid, 7-amino-1,3-naphthalene disulfonic acid, 6-amino-1,3-naphthalene disulfonic acid, 8-amino-1,6-naphthalene disulfonic acid, 8-amino-1,5-naphthalene disulfonic acid, 7-amino-1-naphthol-3,6-disulfonic acid, and 8-amino-1-naphthol-5,7 disulfonic acid. Other suitable such sulfonic acids include anthraquinone sulfonic acids as for example various anthraquinone dyes such as Alizarin Saphirol B (1,5 hydroxy, 2,6 disulfonic, 4,8 amino anthraquinone), Acid Alizarin Blue GRL (1,3,5,7 hydroxy 2,6 disulfonic, 4,8 amino anthraquinone), Alizarin Saphirol SE (1,5 hydroxy, 2 sulfonic, 4,8 amino anthraquinone) and other similar amino and amino hydroxy sulfonic and disulfonic anthraquinones.

The aromatic sulfonic acid preferably has three or more reactive groups, as mentioned previously, to provide sufficient water attractiveness to be a suitable barrier coating and also possibly for reaction with the metal surface of such a support when used alone as it is believed that a chemical reaction occurs in such situations. If the sulfonic acid is used in combination with other ingredients to form the barrier coating, as will be explained in more detail, it is believed that an interreaction occurs involving the sulfonic acid and such other ingredients, and it has been found that in such combinations, better subbases are generally obtained when the preferred sulfonic acids are employed.

One form of the barrier layer which may be employed in this invention and which has been found to be especially suitable is referred to as "a three layer" barrier since it is produced by applying in series three different components. In the first step, an aqueous dispersion of a resin selected from the class consisting of amine-modified unreaformaldehyde resins, alkali metal sulfurous acid salt modified ureaformaldehyde resins, alkylated methylol melamine resins and melamine formaldehyde polyalkaline polyamine resins is applied to the support member. Such water-dispersible resin may be any of those disclosed in U.S. Pat. 3,073,723 and includes alkylated methylol melamine resins produced in accordance with U.S. Pat. 2,715,619 by reacting melamine with formaldehyde in a mixture containing controlled amounts of etherifying alcohol and water under alkaline conditions, alkylation under acid conditions with additional alcohol and concentration of the neutralized syrup to remove excess and unreacted alcohol.

Another resin which may be used is a polyalkaline polyamine melamine formaldehyde resin of the type disclosed in U.S. Pat. 2,796,362. Such resins are characterized by at least five and preferably more than six mols of combined formaldehyde per mol of melamine with the number of nitrogen atoms in the polyalkaline polyamine per mol of melamine being between 0.5 and 10.0.

Another suitable water-dispersible resin is the amine-modified ureaformaldehyde resin of U.S. Pat. 2,554,475. Such resins are infinitely water-dilutable polyfunctional compounds in which the polyfunctional amine contains at least two functional amino groups. They are generally prepared by reacting a polyfunctional amine or salt thereof with urea and formaldehyde or with the condensation product of urea and formaldehyde at a pH and temperature such that there is no viscosity increase, followed by aging at a pH and temperature such that viscosity increases steadily at a controllable rate.

Another resin which may be used is an alkali metal sulfurous acid salt modified unreaformaldehyde resin such as that described in U.S. Pat. 2,559,578.

The water-dispersible resin is preferably applied to a clean surface of a support member in an aqueous dispersion and then the excess is rinsed off with running water which may be tap water. In the preferred process, the resin is employed in an aqueous dispersion containing about 0.1 to 20.0 percent of the resin by weight and the base member is treated with this solution for preferably from about 10 seconds to about 5 minutes. The temperature of the dispersion is lower than the boiling point of water and for commercially satisfactory reasons is preferably from about room temperature to about 185° F. After application of the resin dispersion to the base member, it is rinsed with water, preferably running water.

After the support member has been treated with the water-dispersible resin as described above and washed as specified, it is thereafter coated with an aqueous solution of the previously described aromatic sulfonic acid. The aqueous solution will normally have a concentration in the range of from about 0.1 to 10.0 percent by weight. The preferred range is from about 1 to 2 percent by weight. The mode of application of the sulfonic acid may be any of the standard techniques such as roller coating, whirler coating, dipping, etc. The solution should remain in contact with the plate for approximately 5 seconds to 10 minutes and is generally applied at a temperature from room temperature to about 185° F., although the time and temperature will vary with the particular acid and its concentration.

After the support member has been coated as described, it is preferably contacted with a third material which is an aqueous solution of a water-soluble compound of a metal of Group IV*b* of the periodic table. Such metals, of course, include zirconium, hafnium, titanium and thorium, with zirconium and titanium being preferred. The metal compound is preferably a salt with the acid radical of the salt being any that will make the compound water soluble and will not react with the support member or the previously applied coatings or with the subsequently applied light-sensitive material. Typical salt groups are the acetates, nitrates and sulfates which are relatively inexpensive and readily obtainable. Other salts may also be used, however, subject to the foregoing characteristics.

Such metals are applied as aqueous solutions and preferably have a concentration in the range of from about 0.01 to 10.0 percent by weight. The solution is preferably applied at a temperature of from about room temperature to about 185° F., with the upper temperature being merely a practical upper limit as any temperature may be used which is below the boiling point of water. The treatment with the metal salt solution will preferably be as rapidly as practical and in commercial applications will normally be between about 5 seconds and 10 minutes.

After application of the metal salt solution, the plate will again be rinsed with water, after which the resulting plate base may be stored for later use or alternatively used immediately by applying thereto a coating of a light-sensitive material. The light-sensitive material may be any of the usual materials including diazo compounds, bichromated casein, bichromated albumin, gelatin, etc. Other light-sensitive materials may also be used, including halogenated polyvinyl alcohol in aqueous dispersion or solution as described in U.S. Pats. 2,179,245, 2,199,865 and 2,342,175, dispersions or solutions of proteins such as casein described in U.S. Pats. 2,324,197, 2,324,198 and 2,500,453, and the ferric iron light-sensitive systems described in Adams and Sorkin Pat. 3,169,065. All of these materials are capable of reacting with light and particularly ultraviolet light such as through a transparency to form a lithographic printing plate.

Referring to the diazo materials which have been found to be very suitable light-sensitive materials, numerous such light-sensitive diazo materials may be used. One particularly suitable material is the condensation product of paraformaldehyde with p-diazo diphenyl amine sulfate as described in U.S. Pats. 2,679,498 and 2,100,063. Additional examples of suitable such diazo compounds are described in U.S. Pats. 2,063,631, 2,667,415, 2,692,827, 2,714,066, 2,773,779, 2,778,735, 2,958,599 and 3,030,210.

The dispersion or solution of the sensitizer or light-sensitive material may be applied to the prepared base by dipping, spraying, roller coating, brushing or other conventional manner.

The plate may be exposed to any standard source of actinic light, preferably ultraviolet light, and the exposure time will generally be equivalent to about 10 to 100 lux units at 3000 foot candles, although the time and exposure may vary. A luxometer unit (lux) is a common analytical unit for measuring cumulative quantities of light in terms of intensity time units and as used herein is equal to 13,000 foot candles seconds of illumination wherein the intensity of light is at least 2000 foot candles supplied by a white flame carbon arc source.

Although the exact chemical mechanism of the present invention is not fully understood, it is believed that the three materials of the preferred barrier layer interreact chemically to provide the desired sublayer which is firmly and tightly adhered to the support member. Thus, the three coatings appear to interreact to form a single layer which is adhered to the support member and which accepts and retains the subsequently applied light-sensitive coating. The water-soluble metal compound is believed to function as a curing agent for the two previously applied materials, most probably by finishing the cross-linking occurring therebetween and accordingly serving to produce a barrier layer having the desired properties.

The invention will be better understood by reference to the following specific but non-limiting examples.

EXAMPLE I

An aluminum sheet of the standard type used to prepare lithographic plates was cleaned of surface grease and other contaminants by immersion for about 2 minutes in an aqueous solution of trisodium phosphate at 160° F. The plate was thereafter washed for about 2 minutes with tap water and was subsequently immersed for another two minutes in a desmutting bath comprising a mixture of 2 percent chromic acid and 0.8 percent sulfuric acid.

Following the acid bath, the plate was again rinsed for 2 minutes with water, and the protective sublayer of the present invention was thereafter applied. In such application, the plate was first immersed for about 2 minutes in an 0.55 percent aqueous dispersion of a melamine formaldehyde condensation resin of the type described in U.S. Pat. 2,715,619 and commercially available under the "Uformite" trade name. The plate was subsequently washed with water for approximately 2 minutes, and was thereafter dipped into an aqueous solution of 2.0 percent by weight 1,3,6 naphthalene trisulfonic acid at room temperature which was produced by ion exchange of the trisodium salt of such acid with a high density, sulfonic acid type cation exchange resin commercially available under the trade name "Amberlite IR–120" to remove the sodium ions. The plate remained in the aqueous solution for approximately 2 minutes after which it was washed with water for about 2 minutes. The plate was thereafter dipped into an 0.1 percent aqueous solution of zirconium acetate for approximately 2 minutes. The plate was then again washed with tap water and given a final wash with deionized water and dried.

The plate was next roller coated with a 2.2 weight percent aqueous solution of a diazo material comprising the condensation product of paraformaldehyde and p-diazo diphenyl amine sulfate (Fairmount Chemical Company's Diazo Resin #4). The plate was subsequently dried and exposed through a negative transparency for 80 lux units to an ultraviolet light source.

After exposure, the plate was washed with water to remove the unexposed diazo surface, desensitized and inked in the standard manner. The plate of this example was subsequently used in a lithographic press for normal printing operations, and over 18,000 copies were made from the plate.

EXAMPLE II

The general procedure of Example I was followed, but in this example the first coating of the subbase was an amine-modified ureaformaldehyde resin which was also purchased commercially under the "Uformite" trade name. The plate was thus coated by dipping the clean plate into a 1.2 percent aqueous dispersion of the ureaformaldehyde resin for about 2 minutes.

After application of the ureaformaldehyde coating, the plate was immersed in a 2.0 aqueous solution of 3,amino, 1,5-naphthalene disulfonic acid, which was produced by ion exchange of the disodium salt with Amberlite IR–120 as in Example I, and was subsequently treated with a zirconium acetate solution of the same type and concentration described in Example I. After such treatment, the plate was again roller coated with the diazo resin No. 4, dried and exposed through a negative transparency for 80 lux units. After such exposure, the plate was washed with water, desensitized and inked in the standard manner.

The plate as thus produced, that is without a protective lacquer coating applied thereto, was subsequently used in a lithographic press and produced copies having clear and distinct images thereon.

EXAMPLE III

A raw aluminum sheet was cleaned of surface grease and other contaminants with wet pumice and a brush for approximately 1 minute, after which it was washed in a water spray for about 1 minute. The protective sublayer of this invention was then applied by first immersing the plate for about 2 minutes in an 0.5 weight percent aqueous dispersion of melamine formaldehyde as in Example I, subsequently washed with water for approximately 2 minutes, and thereafter dipped into an aqueous solution of 1.0 percent by weight of 8-amino-1-naphthol, 3,6-disulfonic acid. Since this material is only slowly soluble in water, the aqueous solution was produced by the addition of 0.1 weight percent of sodium hydroxide to 1.0 weight percent of the acid in deionized water to form the disodium salt, which was then ion-exchanged with an Amberlite IR–120 ion exchange resin as in Example I to remove the sodium ions. This produced an aqueous solution of the acid having a pH of 1.0. The plate remained in the aqueous solution for approximately 1 minute after which it was washed with a water spray for about 1 minute. The plate was thereafter dipped into a 0.1 percent aqueous solution of zirconium acetate for approximately 1 minute, after which it was again washed with tap water, given a final wash with deionized water, and dried.

The plate was next roller coated with a 3.0 weight percent aqueous solution of Fairmount Chemical Co.'s Diazo Resin #4 containing 0.75 percent of zinc chloride. The plate was subsequently dried and exposed through a negative transparency for 80 lux units to an ultraviolet light source.

After exposure, the plate was washed with water to remove the unexposed diazo surface, desensitized and inked in the standard manner. The plate of the example without a protective lacquer surface was subsequently used in a lithographic press, and approximately 9000 copies were made from the plate without failure of the unlacquered image, at which time operation was discontinued as being a demonstration of satisfactory performance .

EXAMPLE IV

A plate was prepared following the procedure of Example I but the treatment with the water solution of zirconium acetate was omitted. After expose through a negative transparency, the plate was washed with water to remove the unexposed diazo surface, desentized and inked. The plate was subsequently used in a standard lithographic process, and acceptable copies were produced without failure of the unlacquered image.

EXAMPLE V

In this example, a positive working plate was prepared. A brushed aluminum sheet was cleaned, and the melamine formaldehyde-naphthalene trisulfonic acid-zirconium acetate sublayer of Example I was applied thereto. After drying, the plate base was roller coated with a 1.5 weight percent solution of a diazo resin corresponding to Example I of U.S. Pat. 2,958,599 in ethylene glycol monomethyl ether. After drying, the plate was exposed for 80 lux units through a positive transparency to an ultraviolet light source thus producing a positive image on the surface of the plate. After exposure, the plate was developed with a 3 percent aqueous trisodium phosphate solution, and was finally rinsed with water to remove the water-soluble material. This plate was subsequently used in a lithographic press and copies were obtained with clear and distinctly visible images thereon.

EXAMPLE VI

Following the general procedure of the preceding examples, an aluminum sheet was cleaned by immersion for approximately 3 minutes in a 10% aqueous solution of trisodium phosphate, approximately 3 minutes in a 5% solution of trisodium phosphate, followed by a three minute hot water soak and a 3 minute rinse in a water spray. The plate was thereafter desmutted in a bath consisting of a mixture of chromic acid and sulfuric acid as per the standard technique.

Following the acid bath, the plate was washed in a water spray for about 3 minutes and thereafter dipped into a 0.55% solution of the Uformite amine modified ureaformaldehyde. The plate remained in this dispersion for approximately 3 minutes after which it was washed with water for about 3 minutes and subsequently dipped into a 2% by weight aqueous solution of aniline 2,5 disulfonic acid which was produced by ion exchange of the sodium salt with the previously described Amberlite IR–120. The plate remained in the aqueous solution for approximately 3 minutes after which it was sprayed with water for about 3 minutes and then dipped into a 1 percent by weight solution of zirconium acetate and permitted to remain in such solution for approximately 3 minutes.

After treatment with zirconium acetate, the plate was sprayed with water and subsequently roller coated with a 3% by weight diazo-0.75% zinc chloride solution of Fairmount Chemical Co.'s Diazo Resin #4. The plate was subsequently dried and exposed through a negative transparency for 80 lux units to an ultraviolet light source. After exposure, the plate was desensitized with a Harris desensitizing solution. One-half of the image area of the plate was subsequently lacquered with Harris Developing Lacquer 201 and the plate was subsequently used in a lithographic press for standard printing operations. Acceptable quality reproductions with a clean background were obtained in both the lacquered and unlaquered areas of the plate.

EXAMPLE VII

In this example, an aluminum plate was brush cleaned, washed and dried and subsequently dipped into a 2% by weight aqueous solution of 8-amino-1-naphthol-3,6-disulfonic acid. After removal from the solution, the plate was washed and dried and subsequently sensitized by roller coating with a 4.0 weight percent diazo-0.75% zinc chloride solution. The plate was thereafter dried and exposed through a transparency for 100 lux units.

After exposure the plate was desensitized and one-half of the image area of the plate was lacquered as in the preceding example. After lacquering, the plate was used in standard lithographic operations and acceptable copies were produced with clearly visible images and clean background areas.

EXAMPLE VIII

The procedure of Example VII was followed, but an 0.1 percent aqueous solution of zirconium acetate was applied to the plate base subsequent to application of the aromatic sulfuric acid. The plate was otherwise processed the same as that in Example VII. Copies produced from the plate were good quality prints in both the lacquered and nonlacquered image areas, with clear images and clean backgrounds.

In further examples, each of Examples I–III was repeated except that the light sensitive material used was bichromated albumin rather than the diazo. Surface type negative working lithographic plates having acceptable quality and performance were produced from these examples. Similarly, the procedure of Example V was repeated using bichromated gum arabic as the light-sensitive material to produce a positive working deep etched lithographic plate.

Lithographic printing surfaces produced in accordance with the present invention thus have a novel adherent barrier coating which seals the surface of the base member and prevents contact between the support and the subsequently applied light-sensitive coating. As a result, the presensitized plate has good shelf life and can be stored for long periods of time. Additionally, the barrier layer is hydrophilic and oleophobic so as to be scum preventing and to reduce tone in the resulting printing plate, and it is also substantially free of water-soluble material. As seen from the working examples, plates which combine this barrier layer and a subsequently applied light-sensitive coating are capable of being used to make impressions of very acceptable quality without failure of the image areas.

Other modes of applying the principle of the invention may be employed, change being made as regards the details described, provided the features stated in any of the following claims or the equivalent of such, be employed.

I therefore particularly point out and distinctly claim as my invention:

1. A plate for use in lithographic printing comprising a support member and a hydrophilic barrier coating thereon formed by applying to said support member an aqueous solution whose solute consists essentially of an aromatic sulfonic acid having at least three reactive groups of the group, amino, and sulfonic acid and said aromatic sulfonic acid being chosen from the group consisting of benzene sulfonic acids, amino benzene sulfonic acids, naphthalene sulfonic acids, amino naphthalene sulfonic acids, anthraquinone sulfonic acids, and amino and hydroxy sulfonic anthraquinones, said barrier coating being adapted to provide later-exposed selected hydrophilic areas, a water-dispersible resin selected from the class consisting of amine-modified ureaformaldehyde resins, alkali metal sulfurous acid salt modified ureaformaldehyde resins, alkylated methylol melamine resins and melamine formaldehyde polyalkaline polyamine resins being applied to said support member and set thereon prior to application of said sulfonic acid.

2. A plate for use in lithographic printing comprising a support member and a hydrophilic barrier coating thereon formed by applying to said support member an aqueous solution whose solute consists essentially of an aromatic sulfonic acid having at least three reactive groups of the group, amino, and sulfonic acid and said aromatic sulfonic acid being chosen from the group consisting of benzene sulfonic acids, amino benzene sulfonic acids, naphthalene sulfonic acids, amino naphthalene sulfonic acids, anthraquinone sulfonic acids, and amino and hydroxy sulfonic anthraquinones, said barrier coating being adapted to provide later-exposed selected hydrophilic areas, a water soluble salt of a metal selected from the class consisting of zirconium, hafnium, titanium and thorium being applied to said support member subsequent to the application of said sulfonic acid.

3. The plate of claim 2 in which the support member is an aluminum surfaced plate.

4. The plate of claim 2 in which said aromatic sulfonic acid is aniline disulfonic acid.

5. The plate of claim 2 in which said aromatic sulfonic acid is naphthalene trisulfonic acid.

6. A plate for use in lithographic printing comprising a support member and a hydrophilic barrier coating thereon formed by applying to said support member an aqueous solution whose solute consists essentially of an aromatic sulfonic acid having at least three reactive groups of the group, amino, and sulfonic acid and said aromatic sulfonic acd being chosen from the group consisting of benzene sulfonic acids, amino benzene sulfonic acids, naphthalene sulfonic acids, amino naphthalene sulfonic acids, anthraquinone sulfonic acids, and amino and hydroxy sulfonic anthraquinones, said barrier coating being adapted to provide later-exposed selected hydrophilic areas, a water-dispersible resin selected from the class consisting of amine-modified ureaformaldehyde resins, alkali metal sulfurous acid salt modified ureaformaldehyde resins, alkylated methylol melamine resins and melamine formaldehyde polyalkaline polyamine resins is applied to said support member prior to application of said sulfonic acid and a water soluble salt of a metal selected from the class consisting of zirconium, hafnium, titanium and thorium being applied to said support member subsequent to the application of said sulfonic acid.

7. (Thrice amended.) A lithographic plate comprising a support member, a light-sensitive coating over said support member, and a hydrophilic intermediate layer between said support member and said light-sensitive coating, formed by applying to the support member an aqueous solution whose solute consists essentially of an aromatic sulfonic acid having at least three reactive groups of the group, amino, and sulfonic acid and said aromatic sulfonic acid being chosen from the group consisting of benzene sulfonic acids, amino benzene sulfonic acids, naphthalene sulfonic acids, amino naphthalene sulfonic acids, anthraqinone sulfonic acids, and amino and hydroxy sulfonic anthraquinones.

8. The plate of claim 7 in which a water-dispersible resin selected from the class consisting of amine-modified ureaformaldehyde resins, alkali metal sulfurous acid salt modified ureaformaldehyde resins, alkylated methylol melamine resins and melamine formaldehyde polyalkaline polyamine resins is supplied to said support member and set thereon prior to application of said sulfonic acid.

9. The plate of claim 7 in which a water soluble salt of a metal selected from the class consisting of zirconium, hafnium, titanium and thorium is applied to said support member subsequent to the application of said sulfonic acid.

10. The plate of claim 7 in which a water-dispersible resin selected from the class consisting of amine-modified ureaformaldehyde resins, alkali metal sulfurous acid salt modified ureaformaldehyde resins, alkylated methylol melamine resins and melamine formaldehyde polyalkaline polyamine resins is applied to said support member prior to application of said sulfonic acid and a water soluble salt of a metal selected from the class consisting of zirconium, hafnium, titanium and thorium is applied to said support member subsequent to the application of said sulfonic acid.

11. The lithographic plate of claim 10 in which said water-dispersible resin is applied in a solution which contains about 0.1 to 20.0 weight percent of the resin, said water soluble salt being applied in a solution which contains about 0.1 to 10 weight percent of said salt, and said aqueous solution of aromatic sulfonic acid has a concentration of from about 1.0 to 10.0 weight percent.

12. The lithographic plate of claim 7 in which said light-sensitive coating is a diazo compound.

13. The lithographic plate of claim 10 in which said water-dispersible resin is one of said modified ureaformaldehyde resins.

14. The lithographic plate of claim 10 in which said water-dispersible resin is one of said melamine formaldehyde resins.

15. The lithographic plate of claim 10 in which said water-soluble salt is zirconium acetate.

16. The lithographic plate of claim 7 in which said support member is an aluminum surfaced plate.

17. In a process of preparing a lithographic plate, forming a hydrophilic barrier coating on a support member by applying to such member an aqueous solution of a solute consisting essentially of sulfonic acid having at least three reactive groups of the group, amino, and sulfonic acid and said aromatic acid being chosen from the group consisting of benzene sulfonic acids, amino benzene sulfonic acids, naphthalene sulfonic acids, amino naphthalene sulfonic acids, anthraquinone sulfonic acids, and amino and hydroxy sulfonic anthraquinones, a water-dispersible resin selected from the class consisting of amine-modified ureaformaldehyde resins, alkali metal sulfurous acid salt modified ureaformaldehyde resins, alkylated methylol melamine resins and melamine formaldehyde polyalkaline polyamine resins being applied to said support member and set thereon prior to application of said sulfonic acid.

18. In a process of preparing a lithographic plate, the steps comprising forming a hydrophilic barrier coating on a support member by applying to such member an aqueous solution of a solute consisting essentially of sulfonic acid having at least three reactive groups of the group, amino, and sulfonic acid and said aromatic acid being chosen from the group consisting of benzene sulfonic acids, amino benzene sulfonic acids, naphthalene sulfonic acids, amino naphthalene sulfonic acids, anthraquinone sulfonic acids, and amino and hydroxy sulfonic anthraquinones, and subsequently applying an aqueous solution of a water soluble salt of a metal selected from the group consisting of zirconium, hafnium, titanium and thorium to form the hydrophilic barrier coating.

19. In a process of preparing a lithographic plate, the steps comprising forming a hydrophilic barrier coating on a support member by applying to such member an aqueous solution of a solute consisting essentially of sulfonic acid having at least three reactive groups of the group, amino, and sulfonic acid and said aromatic acid being chosen from the group consisting of benzene sulfonic acids, amino benzene sulfonic acids, naphthalene sulfonic acids, amino naphthalene sulfonic acids, anthraquinone sulfonic acids, and amino and hydroxy sulfonic anthraquinones, and subsequently applying a coating of a light-sensitive material over the hydrophilic barrier layer.

20. The process of claim 19 in which selected areas of such light-sensitive material are subsequently exposed to light, and selected areas of such light-sensitive material are thereafter removed from the surface of such plate.

21. The process of claim 19 in which said aromatic sulfonic acid is naphthalene trisulfonic acid of about 0.1 to 10.0 weight percent concentration in water.

22. The process of claim 19 in which said light-sensitive material is a diazo compound.

23. The plate of claim 1 in which the support member is an aluminum surfaced plate.

24. The plate of claim 1 in which said aromatic sulfonic acid is aniline disulfonic acid.

25. The plate of claim 1 in which said aromatic sulfonic acid is naphthalene trisulfonic acid.

References Cited

UNITED STATES PATENTS

| | | | |
|---|---|---|---|
| 2,184,289 | 12/1939 | Dangelmajer | 96—33 |
| 3,073,723 | 1/1963 | Deal et al. | 96—33X |
| 3,169,065 | 2/1965 | Sorkin et al. | 96—33 |
| 3,289,577 | 12/1966 | Uhlig | 96—33X |
| 3,307,951 | 3/1967 | Adams et al. | 96—86 |
| 1,888,457 | 11/1932 | Gann et al. | 148—6.24X |
| 2,001,753 | 5/1935 | Tanner et al. | 148—6.24X |
| 2,391,522 | 12/1945 | Slunder | 148—6.1X |
| 2,814,576 | 11/1957 | Zickendraht et al. | 148—6.1X |
| 2,927,872 | 3/1960 | Cohn | 148—6.1 |
| 2,945,778 | 7/1960 | Lipinski | 148—6.24 |

DONALD LEVY, Primary Examiner

R. E. MARTIN, Assistant Examiner

U.S. Cl. X.R.

96—86, 75; 101—453, 457, 459, 463; 117—34; 148—6.24

PO-1050
(5/69)

UNITED STATES PATENT OFFICE
CERTIFICATE OF CORRECTION

Patent No. 3,549,365 Dated December 22, 1970

Inventor(s) DANIEL C. THOMAS

It is certified that error appears in the above-identified patent and that said Letters Patent are hereby corrected as shown below:

Column 1, line 52, "materital" should read -- material --. Column 2, line 3, "ligh" should read -- light --; line 41, "point" should read -- pointed --; line 48, "compirses" should read -- comprises --; line 56, insert -- a -- before "metal". Column 3, line 66, "unrea-formaldehyde" should read -- ureaformaldehyde --. Column 4 line 23, "unreaformaldehyde" should read -- ureaformaldehyd Column 5, line 40, "." should read -- , --. Column 7, line "the" after "of" should read -- this --; line 22, "expose" should read -- exposure --; line 24, "desentized" should re -- desensitized --; line 60, "modifled" should read -- mod fied --. Column 9, line 38, "acd" should read -- acid --; line 54, delete "(Thrice amended)".

Signed and sealed this 16th day of November 1971 .

(SEAL)
Attest:

EDWARD M.FLETCHER,JR.
Attesting Officer

ROBERT GOTTSCHALK
Acting Commissioner of Pate